United States Patent
Wong-Lam et al.

(10) Patent No.: US 6,477,476 B1
(45) Date of Patent: Nov. 5, 2002

(54) PERIODIC-SIGNAL ANALYSIS VIA CORRELATION

(75) Inventors: Ho Wai Wong-Lam, Los Altos, CA (US); Mark Douglas Naley, Santa Clara, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/455,126

(22) Filed: Dec. 6, 1999

(51) Int. Cl.$^7$ ............................................... G06F 19/00
(52) U.S. Cl. ........................ 702/66; 324/76.22; 600/300
(58) Field of Search ............................. 702/66, 67, 70, 702/71, 73, 74, 75, 76, 79, 193; 600/300, 500, 517; 324/76.22

(56) References Cited

U.S. PATENT DOCUMENTS

| | | | | |
|---|---|---|---|---|
| 4,403,184 A | * | 9/1983 | Witt et al. ................. 324/76.22 |
| 4,463,425 A | * | 7/1984 | Hirano et al. ................ 600/300 |
| 4,899,289 A | * | 2/1990 | Appel ........................... 702/74 |
| 5,321,350 A | | 6/1994 | Haas ........................ 324/76.11 |
| 5,365,934 A | * | 11/1994 | Leon et al. .................. 600/517 |
| 5,436,847 A | | 7/1995 | Schroer ....................... 364/485 |
| 5,558,096 A | * | 9/1996 | Palatnik ....................... 600/500 |
| 5,592,390 A | | 1/1997 | Liken et al. ................. 364/487 |
| 5,637,994 A | | 6/1997 | Carder ..................... 324/76.13 |

* cited by examiner

Primary Examiner—Marc S. Hoff
Assistant Examiner—Mohamed Charioui
(74) Attorney, Agent, or Firm—John Vodopia (57) ABSTRACT

The present invention is directed to systems and methods for analyzing and characterizing a time-limited waveform to avoid significant delays and miscalculations due to the presence of spurious transitions. In an example implementation, a processor is adapted to sense the signal and interpret various parameters of the waveform using a correlation method. In one application, the correlation method includes providing an autocorrelation function of a segment of the waveform that includes at least one period, and approximating a period of the waveform using peaks in the autocorrelation function. Other aspects of the invention involve approximating the period of the waveform by identifying a segment of the waveform having a steep slope magnitude that exceeds a certain threshold, and determining a polarity associated with the waveform.

17 Claims, 4 Drawing Sheets

SAMPLE NUMBER

PERIODIC-SIGNAL ANALYSIS VIA CORRELATION

RELATED PATENT DOCUMENT

This application is related to our co-pending patent application entitled "High and Low Voltage Measurement in Waveform Analysis," U.S. patent application Ser. No. 09/455,127, concurrently-filed herewith and incorporated herein by reference in its entirety.

FIELD OF THE INVENTION

The present invention relates generally to analysis of periodic signals and, more particularly, to a robust and accurate technique for measuring and characterizing waveforms of periodic signals, for example, in connection with testing and evaluating electronic circuits.

BACKGROUND OF THE INVENTION

Measuring and characterizing periodic signals is an important part of a variety of technical fields including, for example, test instruments such as oscilloscopes and programmable test fixtures. In these technical fields, measuring and characterizing periodic signals typically includes determining the period, duty cycle and pulse width of the received signal. For example, oscilloscopes are commonly used to measure and characterize (display) the waveform of signals in electrical circuits. Based on certain measurements of sensed current or voltage in such signals, conventional oscilloscopes are adapted to characterize the waveform a function of detecting when the signal crosses a reference level. Using the reference level crossing, the waveform is typically characterized in terms of an estimated duty cycle and/or pulse width.

The accuracy of the waveform characterization is largely dependent on the algorithm used to provide this estimation. In one conventional algorithm, for example, the positive and negative pulse widths are determined by the difference in time between two consecutive crossings of the reference level with different polarities, and the period is determined by the difference in time between the third and first crossings with the same polarity. Another algorithm uses crossings of the reference level for real-time determination of period and frequency to analyze time-unlimited signals, such as human voice received via a microphone. For each of these approaches, the accuracy of the waveform characterization, or estimation, is dependent upon the processing of the parameters used to define the waveform, such as the pulse, duty cycle and pulse width of the waveform.

For applications involving the measurement and characterization of time-limited signals, including applications involving use of the digital oscilloscope, the received signal often includes undesirable spurious transitions. For conventional algorithms that characterize the received signal based on reference-level crossings, spurious transitions around the reference-level crossings can cause erroneous characterizations of the true signal. For example, the signal can be characterized to include a nonexistent polarity change.

Many such conventional algorithms use a "relative reference level." The relative reference level is based on a reference level relative to the high and low voltage levels that determine the 100% and 0% levels, respectively. In many conventional test systems, the waveform middle reference level, MidRef, is typically user-set at 50% and is often used to define the positive duty cycle ($D_+$) and amplitude levels. The waveform middle reference level is typically set at 50%. An ideal square waveform has infinitely sharp transitions and, hence, $D_+$ has a well-defined meaning without regard to a reference level. In practical waveforms with finite transition slopes, $D_+$ would depend on a reference level. Although the reference level does not commonly refer to an absolute level, in some applications, an absolute level has a meaning such as where an absolute DC level is used for a signal that goes into a charge pump, and the positive part of the signal pumps while the negative part pulls.

Assuming that the time at which the waveform s(t) crosses MidRef is denoted as $t_m$, the slopes at the crossings should alternate in polarity and the period P can be defined as follows:

$$P = t_3 - t_1 \tag{1}$$

If the waveform has a positive slope at the first crossing, the positive and negative pulse widths $W_+$ and $W_-$ are calculated as follows:

$$W_+ = t_2 - t_1 \text{ and } W_- = t_3 - t_2 \tag{2}$$

Otherwise, $$W_+ = t_3 - t_2 \text{ and } W_- = t_2 - t_1 \tag{3}$$

The positive and negative duty cycles $D_+$ and $D_-$ are calculated as follows:

$$D_+ = W_+/P \text{ and } D_- = W_-/P \tag{4}$$

Figure 1:
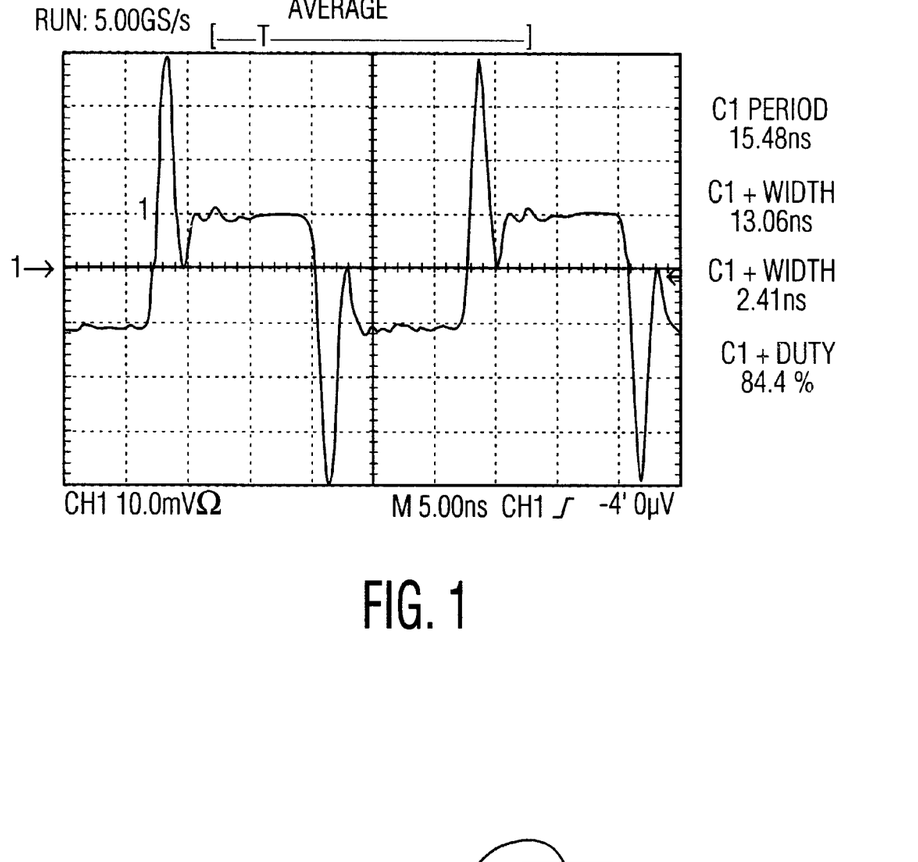
FIG. 1 is graph illustrating a waveform as characterized according to the prior art.

As mentioned above, using such a conventional crossings method to analyze and characterize a periodic waveform can be problematic. FIG. 1 depicts the measurement results of using this approach through illustrations of the period, positive and negative pulse widths and the positive duty cycle, with MidRef set at 50%. Because this waveform has significant undershoots that touch MidRef, the measured values of the period (P), the pulse width (W)_ and the positive duty cycle ($D_+$) are erroneous. For further information pertaining to the above, and other related approaches, reference may be made to U.S. Pat. No.: 5,321,350, entitled, "Fundamental Frequency And Period Detector;" U.S. Pat. No. 5,436,847 entitled, "Method For Determining A Periodic Pattern In A Line Spectrum;" U.S. Pat. No. 5,592,390 entitled "Time-based Method For Analyzing A Waveform;" and U.S. Pat. No. 5,637,994 entitled, "Waveform Measurement."

In view of the above, there is a need for improved approaches to the analysis and characterization of such period waveforms so as to mitigate their sensitivity to spurious transitions which can severely degrade the overall characterization of the sensed signal.

SUMMARY OF THE INVENTION

The present invention involves methods and arrangements directed to the accurate analysis of time-limited signal waveforms while avoiding significant delays and/or miscalculations due to the presence of spurious transitions. The present invention is exemplified in a number of implementations and applications, some of which are summarized below.

According to an example embodiment, the present invention is directed to a system and method for analyzing and characterizing a waveform of a time-limited signal having at least one period. For example, a processor may be configured and arranged to sense the signal and interpret various parameters of the waveform using a correlation method. In one application, the correlation method includes providing an autocorrelation function of a segment of the waveform that includes at least one of the periods, and approximating a period of the waveform using peaks in the autocorrelation function.

In more specific applications, the above correlation method also includes approximating the period of the waveform by identifying a segment of the waveform having a slope that exceeds a certain threshold, and determining a polarity associated with the period of the waveform.

Other example embodiments are directed to providing data corresponding to a comparison waveform segment, measuring a time difference between consecutive maximum and minimum levels of a segment of the time-limited signal, and determining the polarity of the segment by cross-correlating the data corresponding to the comparison waveform segment and data corresponding to the segment of the time-limited signal.

In yet other embodiments of the present invention, the autocorrelation function represents a measure of correspondence between the segment of the waveform and a time-shifted version of the segment of the waveform. For example, in more specific embodiments, the autocorrelation function represents a measure of similarity of the segment of the waveform with a time-shifted version of the segment of the waveform, and the measure of similarity is greatest where the segment of the waveform, relative to the time-shifted version, is shifted one complete period. In an alternative embodiment, the autocorrelation function represents a measure of dissimilarity of the segment of the waveform with a time-shifted version of the segment of the waveform, and the measure of dissimilarity is greatest where the segment of the waveform is shifted relative to the time-shifted version by an amount corresponding to a pulse width of the waveform.

The above summary of the present invention is not intended to describe each illustrated embodiment or every implementation of the present invention. For example, in other embodiments, various aspects of these embodiments are combined. The figures and detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of systems and instruments for analyzing periodic waveforms. The invention has been found to be particularly beneficial in applications requiring accuracy in the analysis of periodic waveforms that may be susceptible to spurious transitions and other interference. Among many others, example applications include testing of electronic devices and circuits.

In a first example implementation of the present invention, an oscilliscope is adapted to probe, analyze and characterize a periodic signal in an electric or electronic device. The oscilloscope includes a conventional signal probe adapted to sense the current and/or voltage at a node in a circuit, and a CPU arrangement programmed (or non-programmable logic circuit designed) to sample the signal presented by way of the probe and to interpret various parameters of the waveform using an autocorrelation method. In one example application, the autocorrelation method includes providing an autocorrelation function of a segment of the waveform that includes one or more of the periods, and approximating one of the waveform periods using peaks in the autocorrelation function.

Figure 2:
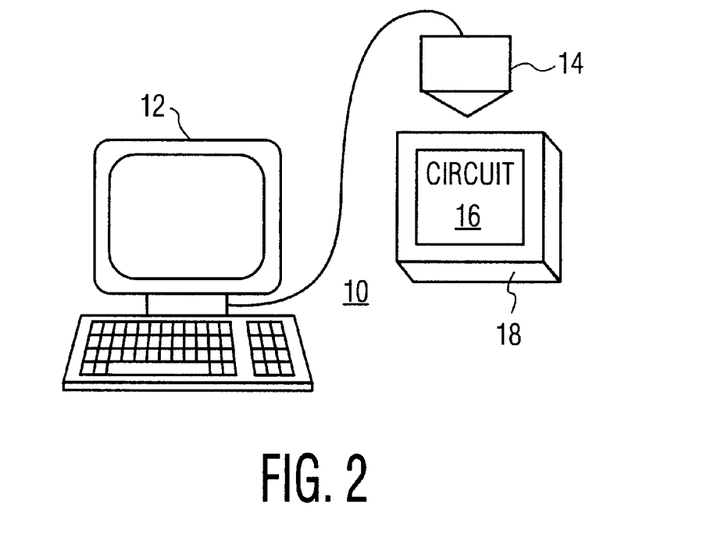
FIG. 2 a test system adapted according to an example embodiment of the present invention.

Another embodiment of the present invention is directed to a test system, depicted as 10 in FIG. 2. The system 10 includes a test tool 12, such as a desktop computer or another test/analysis tool, having circuitry or a CPU arrangement adapted to use a probe 14 for sample signals at a node in an IC 16. The IC 16 may be secured in a test fixture 18 (e.g., a probe card or microscopic signal probe). The test tool 12 can access the IC through a conventional serial or parallel port and, if needed, interface circuitry such as an internal PCI digital I/O board or an external programmable logic device (PLD).

In alternative example implementations, the periodic signal is sourced from, or corresponds to, a simulated signal, a computer model, mechanical devices, and a data analysis package such as MATLAB.

According to the present invention and for each of the above example embodiments, the waveform of the signal tapped or represented at the selected node in the circuit is accurately measured and characterized by using an autocorrelation function of a segment of the signal waveform, and approximating one of the waveform periods using peaks in the autocorrelation function. Various aspects of related embodiments of the present invention can be appreciated mathematically using the following parameters and terms pertaining to time measurements: period P, positive pulse width $W_+$, negative pulse width $W_-$, positive duty cycle $D_+$, and negative duty cycle $D_{31}$. Of these five parameters, the period P and the duty cycle D can be used to determine the other quantities uniquely in view of their inter-relationships, as follows:

$$D_+ = W_+/P, \ D_- = W_-/P \text{ and } W_+ + W_- = P. \tag{5}$$

The period P of a truly periodic signal s(t) can be defined as s(t)=s(t+P), for t from the beginning of time to eternity. In practical measurements, these requirements would be too stringent a requirement for realistic signals. Instead, the period P of a periodic signal is represented such that s(t) is most similar to s(t+P). The equivalence or similarity should hold only for a limited time window ($0 \leq t \leq W$).

Unless otherwise indicated, duty cycles and pulse widths pertain only to pulse-shaped waveforms. These waveforms have the characteristics that they are essentially two-level waveforms and the transitions from one level to the other level occur in a short time, compared to other time dimensions, e.g., period and pulse widths.

The positive duty cycle $D_+$ of an ideal unit-amplitude and zero-phase waveform q(t) with period P can be represented as:

$$q(t)=+1 \text{ for } 0 \leq t \leq D_+P$$

$$q(t)=-1 \text{ for } D_+P \leq t \leq P \quad (6)$$

For applications of the present invention involving use of an A-to-D converter in the data sampling process, sampled data can be referred to as $s_n=s(nT)$, where T is the sampling period. Because of the limited time span of captured signals, $s_n$ is defined only for $0 \leq n < N$. Therefore, for $n<0$ or $n \geq N$, $s_n=0$.

An important aspect of the present invention pertains to the use of an auto-correlation function to quantify the similarity of a waveform with a time-delayed version of itself. The auto-correlation function $R_n$ is:

$$R_n = \sum_{m=0}^{N-1} s_{n+m} s_m \text{ for } -(N-1) \leq n \leq N-1 \quad (7)$$

Figure 3:
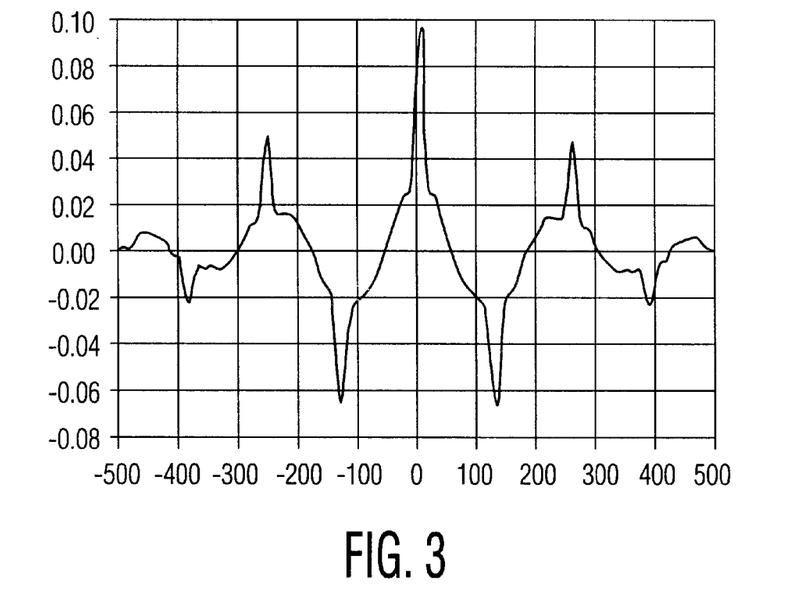
FIG. 3 is graph illustrating an autocorrelation of the waveform characterized in FIG. 1.

FIG. 3 shows the auto-correlation function for the waveform in FIG. 1. The distance of the first positive peak from the main positive peak relates to the period, and measuring the similarity of the waveform with its time-shifted version. Where there is a maximum correlation at a certain time shift, the waveform is most similar to itself by having shifted one complete period.

Similarly, the relationship of a waveform with a time-delayed version of itself can be viewed by their dissimilarity in terms of the minimum peak within a period. For pulse-shaped waveforms, the waveform tends to be most dissimilar with its time-shifted version when the time shift is equal to its positive (or negative) pulse width, i.e., when transitions occur. However, the polarity information of the original signal is lost in the auto-correlation function.

In a more specific embodiment of the present invention, the autocorrelation function can be compensated to improve the robustness of the technique in connection with determining the peak locations. Because of the limited time span of $s_n$, the envelope of $R_n$ goes to 0 towards the edges. The robustness in determining the peak locations is improved by performing a rough but effective edge-effect compensation, as follows:

$$R_n^* = \frac{R_n}{N - |n|} \quad (8)$$

Figure 4:
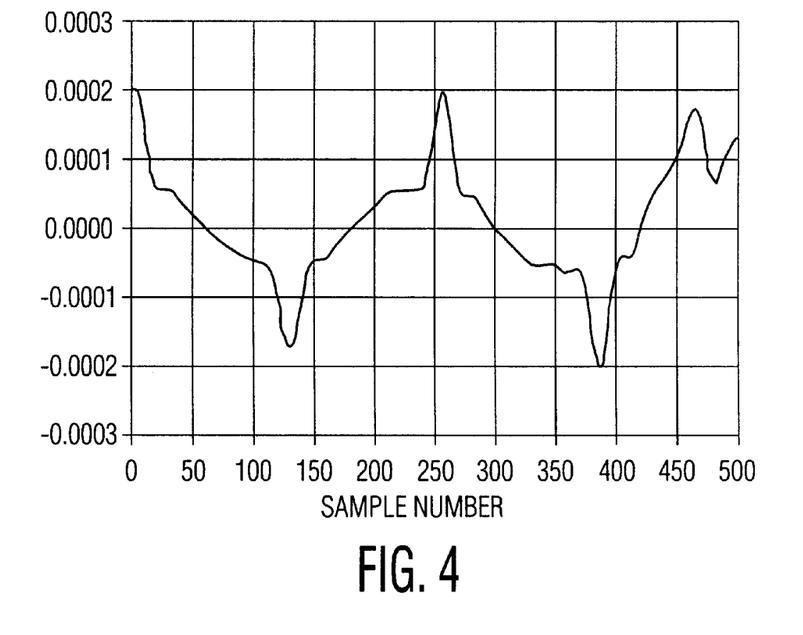
FIG. 4 is graph illustrating a compensated autocorrelation of the waveform characterized in FIG. 1, according to the present invention.

Using the waveform depicted in FIG. 1, FIG. 4 shows the edge-effect compensated auto-correlation function $R^*_n$ only for $0 \leq n \leq N-1$, with $R_n$ and $R^*_n$ being symmetric around 0.

Also in accordance with various embodiments of the present invention, a robust but rough estimation of the period P can be realized by using peak detection. To find the period P determined by the correlation method, a peak detector is used to detect the smallest p where there is a local maximum, with the qualification that $$R^*_p - \min(R^*_n) > 0.9 \times (R^*_0 - \min(R^*_n)).$$

If p is used to determine solely the period P, the resolution of the measurement is limited either by the resolution of the sampling interval or by the interpolation/extrapolation techniques used. Where the peaks in the auto-correlation occur, the slopes are apt to be small, and the measurement sensitivity is intrinsically limited even if the best interpolation/extrapolation technique is used.

The accuracy of the measurement can be further improved by searching for crossings with steep slopes which are roughly spaced apart from each other by a distance "p." In this manner, the present invention provides an accurate period calculation using p as qualifier. Instead of using the value p found with the correlation method to solely determine the period P, the accuracy of the measurement is improved by searching for crossings with steep slopes which are roughly spaced apart from each other by p. This approach can be achieved using the following example process.

First, the maximum slope magnitude S of $s_n$ is determined. To find the location where the first steep slope occurs, a peak detector is used to detect the smallest j where there is a local maximum in the slope magnitude (denoted as $s'_j$), with the qualification that $s'_j > 0.5 \times S$. If $s'_j > 0$, a location k is sought such that $s_k < s_j$ and $s_{k+1} \geq s_j$, with the qualification that k is sought in a narrow region defined as $j+p-r \leq k \leq j+p+r$, where 2r determines the width of the narrow region. The fractional index $\tilde{k}$ is determined by linear interpolation to be:

$$\tilde{k} = \frac{(s_j - s_k)}{(s_{k+1} - s_k)} + k, \text{ and the period } P = \tilde{k} - j.$$

If $s'_j \leq 0$, a location k is sought such that $s_k > s_j$ and $s_{k+1} \leq s_j$. The rest of the qualification and search is the same as above. Using this method, the period P for the waveform in FIG. 1 is correctly found to be 25.41 ns, as shown below in connection with Table 1.

Basing the accurate period measurement on the locations of steep slope magnitude has a number of advantages. For example, the measurement sensitivity is good, because the waveform is exhibiting large changes at that point, and there is no need for a reference level in the definition of a period. Moreover, the above procedure can be readily modified to accommodate any desire for the user to measure the period at a pre-defined reference level. Further, the search for k in a narrow region around j+p ensures that the two crossings are nearly p apart from each other, thus making the approach very robust against spurious crossings.

According to another important aspect, embodiments of the present invention provide a robust but rough estimation of the duty cycle $D_+$. A rough estimation of the pulse width location l can be found where $R^*_l = R^*_{min} = \min_{\{for\ 0 \leq n \leq p\}} (R^*_n)$. In FIG. 4, the pulse width location l is found to be 129. However, at this point, whether l/P determines the positive duty cycle or the negative duty cycle is unknown, because the auto-correlation function intrinsically ignores the polarity of the original waveform $s_n$.

Figure 5:
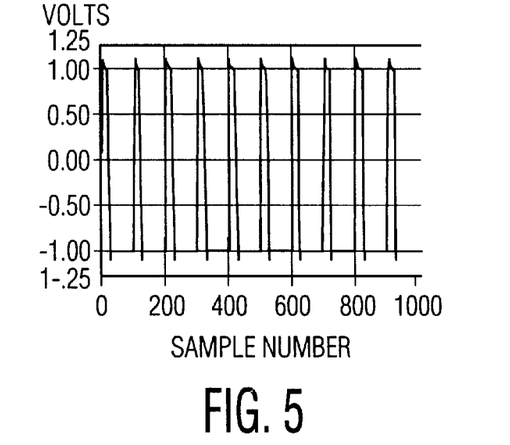
FIG. 5 is graph illustrating a conventional waveform with a 20% positive duty cycle.
Figure 6A:
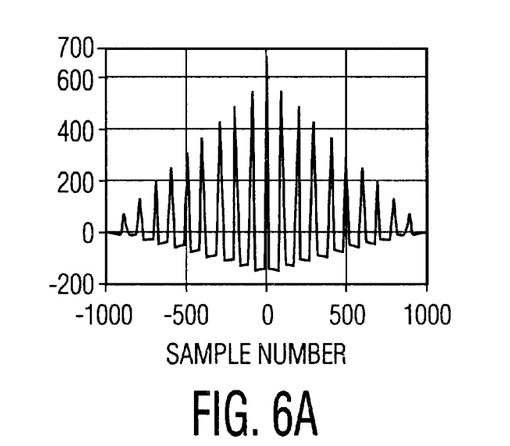
FIGS. 6a and 6b respectively illustrate an auto-correlation function and a compensated auto-correlation function of the waveform of FIG. 5, according to the present invention.
Figure 6B:
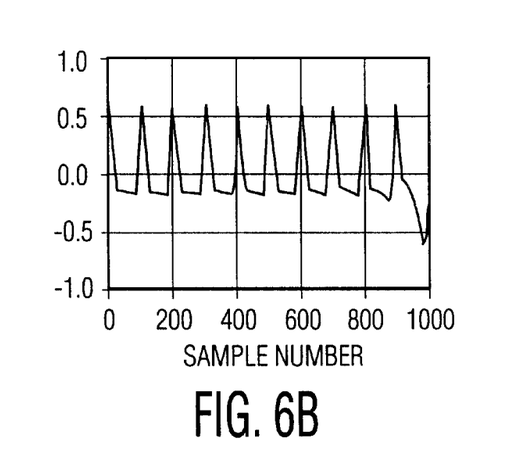

For a waveform $s_n$ with positive duty cycle $D_+$, where $s_n$ closely resembles an ideal square wave and $s_n$ has many periods, i.e. P<<N, there will be a range of l ($l \in \Lambda = (\min(D_+, D_-) \times P, \max(D_+, D_-) \times P)$) that satisfies $R^*_l \approx R^*_{min}$. The parameter $s_n$ is as dissimilar with all its different time-shifted versions, as long as the shift l∈Λ. For illustration purposes, FIGS. 6a and 6b show the auto-correlation function $R_n$ and the edge-effect compensated function $R^*_n$ for the nearly ideal square waveform shown in FIG. 5.

As another aspect of the present invention, this case can be accommodated by modifying the algorithm to find a rough estimate of l, such that l is the minimum (or, in other words arbitrarily, maximum) index in the range of Ξ, where l∈Ξ such that $R^*_{min} \leq R^*_l \leq R^*_{min} + (R^*_0 - R^*_{min})\Xi\lambda$, where λ is typically a few percent.

To determine the polarity, two reference signals are generated: $q_{1,n}$ and $q_{2,n}$ for $-(N-1) \leq n \leq 2(N-1)$ with $D_+ = l/P$ and $D_+ = (P-l)/P$, respectively:

$$q_{1,n} = +1 \text{ for } 0 \leq n \text{ mod } P < l \quad (9)$$

$q_{1,n} = -1$ otherwise $$q_{2,n} = +1 \text{ for } 0 \leq n \text{ mod } P < P-l \quad (10)$$

$q_{2,n} = -1$ otherwise

The cross-correlation function $C_{1,n}$ of $q_{1,n}$ is $$C_{1,n} = \sum_{m=0}^{N-1} s_m q_{1,m+n} \text{ for } -2(N-1) \leq n \leq 2(N-1), \quad (11)$$

Similarly, the cross-correlation $C_{2,n}$ of $q_{2,n}$ can be calculated.

The length of $q_{1,n}$ and $q_{2,n}$ (=3(N−1)+1) ensures that the cross-correlation does not suffer from edge effect for $0 \leq n \leq N-1$.

Where $\max(C_{1,n}) > \max(C_{2,n})$, $q_{1,n}$ has been generated with the same duty cycle as $s_n$ and hence the positive duty cycle $D_+ = l/P$ and the negative duty cycle $D_- = (P-l)/P$. On the other hand, where $\max(C_{1,n}) \leq \max(C_{2,n})$, $D_+ = (P-l)/P$ and $D_- = l/P$. For the following discussion, $C_n$ is used to denote $C_{1,n}$ in case 1 or $C_{2,n}$ in case 2.

Figure 7:
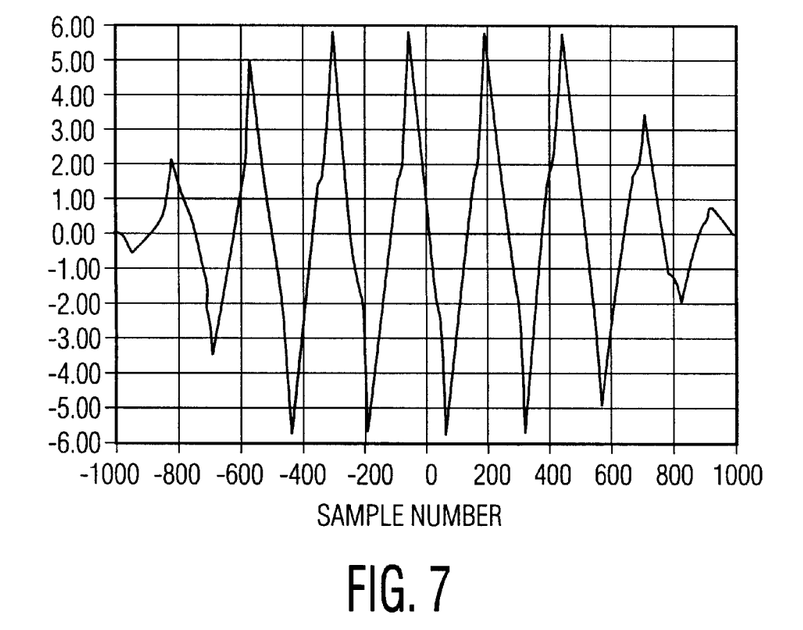
FIG. 7 is graph illustrating a cross-correlation of the waveform in FIG. 1, according to the present invention.

FIG. 7 shows the cross-correlation function $C_{1,n}$ of the waveform in FIG. 1.

Using the correlation method only, the positive and negative duty cycles for the waveform in FIG. 1 are found to be 50.79% and 47.21% respectively. These results, which are shown in Table 1, are not adversely affected by the spurious crossings.

Using l solely to determine $D_+$ results in the resolution of the measurement being limited due to the same reasons mentioned above for calculating the period.

In determining the phase of a waveform, it is advantageous to consider definable parameters relative to a reference waveform since the phase of a waveform only has meaning when it is compared to another similar waveform. For example, it is useful to determine the phase θ of $s_n$ relative to our known square waveform $q_n$, both waveforms having the same duty cycle of $D_+$. Essentially, the phase θ corresponds to the first peak to the left of 0 on the correlation plot. In a similar manner, we can calculate the phase θ=ϕ modulo P where $$C_\phi = \max_{\{across \forall n < 0\}}(C_n) \quad (12)$$

Figure 8:
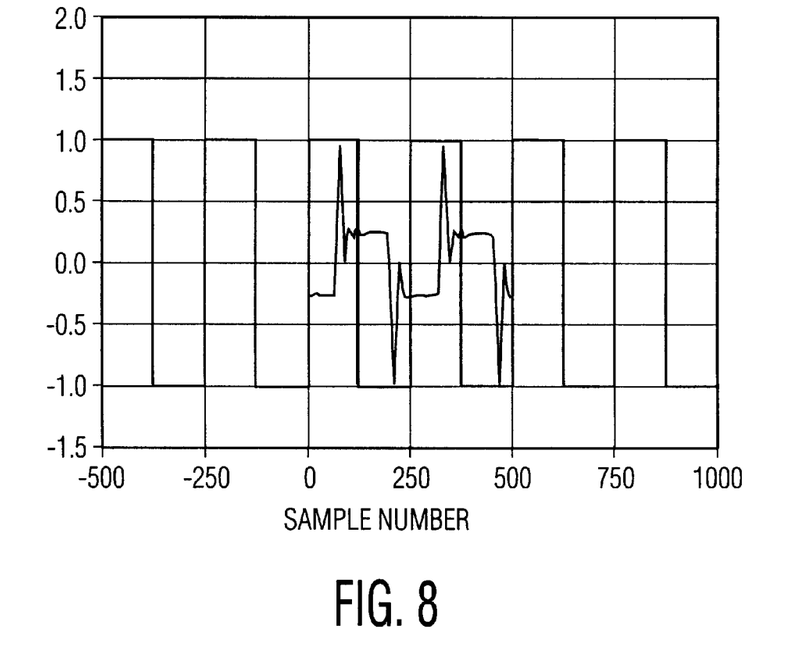
FIG. 8 is graph illustrating the phase relationship between the waveform in FIG. 1 and a reference square wave, according to the present invention.

The range of n is restricted to the negative values only, because θ is defined to be the phase with respect to the reference signal $q_n$ and a shift to the right in phase represents a cross-correlation with a negative index. Using this method, the phase θ of $s_n$ is found to be 75 for the waveform in FIG. 1. This corresponds well with the actual phase relationship of $s_n$ and $q_n$, as shown FIG. 8.

As discussed above, defining the positive (or negative) duty cycle is tantamount to determining the distance between two edges at a certain reference level $L_r$. By viewing duty cycle in this manner, the duty cycle $D_+$ can be accurately calculated using l as qualifier.

Without loss of generality, we shall henceforth assume that l is the index corresponding to positive duty cycle. Otherwise, l simply replaces (P−l), and the approximate phase θ and $D_+$ (≈l/P) are known. Similarly, the approximate positive-going location $k_{30}$ and the pairing negative-going edge location $k_-$ are known. The following example procedure can be used to calculate $D_+$:

1. Find the location $\tilde{k}_{30}$ using the interpolation method described above where the waveform would cross $L_r$ with a positive slope, in the narrow region $\theta - w \leq \tilde{k}_+ \leq \theta + w$, where 2w determines the width of the narrow region.

2. If $\tilde{k}_+$ can be found, proceed on the next step. Otherwise, there is an error and the procedure is terminated.

3. Attempt to find the location $\tilde{k}_-$ where the waveform would cross $L_r$ with a negative slope, in the narrow region $\theta + l - w \leq \tilde{k}_- \leq \theta + l + w$, where 2w determines the width of the narrow region.

4. If $\tilde{k}_-$ can be found, calculate $$D_+ = \frac{(\tilde{k}_- - \tilde{k}_+)}{P},$$

otherwise proceed to the next step.

5. Attempt to find the location $\tilde{k}_-$ where the waveform would cross $L_r$ with a negative slope, in the narrow region $\theta + l - P - w \leq \tilde{k}_- \leq \theta + l - P + w$, where 2w determines the width of the narrow region. This step attempts to find the negative-going edge to the right of the positive-going edge. If there is none, this step attempts to find the negative-going edge the left.

6. If $\tilde{k}_-$ can be found, calculate $$D_+ = \frac{(\tilde{k}_+ - \tilde{k}_-)}{P}.$$

If not, there is an error.

Using this combined correlation and crossings method, the positive and negative duty cycles for the waveform in FIG. 1 are found to be 51.69% and 48.31% respectively, as shown below in Table 1. Thus, Table 1 includes the time measurement results for the waveform in FIG. 1 using the improved correlation method, according to the present invention. In this example, a reference level of 0.0V is used; however, other reference levels can be used.

TABLE 1

| Waveform Time Measurements (correlation only) | |
| --- | --- |
| Positive Pulse Width | 12.90E−9 |
| Negative Pulse Width | 12.50E−9 |
| Positive Duty Cycle (%) | 50.79 |
| Negative Duty Cycle (%) | 49.21 |
| Period | 25.41E−9 |

TABLE 1-continued

| Waveform Time Measurements (Correlation and Crossings Method: Lref = 0.0 V) | |
|---|---|
| Positive Pulse Width | 13.13E−9 |
| Negative Pulse Width | 12.27E−9 |
| Positive Duty Cycle (%) | 51.69 |
| Negative Duty Cycle (%) | 48.31 |
| Period | 25.41E−9 |

Accordingly, the present invention provides a more robust and more accurate correlation-based approach for analyzing and characterizing periodic waveforms. While the present invention has been described with reference to several particular example embodiments, those skilled in the art will recognize that many changes may be made thereto. For example, selected aspects of the present invention, as discussed above, can be used together or selectively to enhance approaches that would otherwise be less accurate. These and other embodiments do not necessarily depart from the spirit and scope of the present invention, which is set forth in the following claims.

What is claimed is:

1. A correlation method for analyzing the waveform of a time-limited signal having a plurality of periods, comprising:
   providing an autocorrelation function of a segment of the waveform that includes at least one of the periods;
   obtaining an approximate period of the waveform using peaks in the autocorrelation function;
   providing data corresponding to a comparison waveform segment;
   measuring a time difference between consecutive maximum and minimum levels of a segment of the time-limited signal; and
   determining the polarity of the segment by cross-correlating the data corresponding to the comparison waveform segment and data corresponding to the segment of the time-limited signal.

2. A correlation method for analyzing the waveform of a time-limited signal, according to claim 1, wherein the autocorrelation function represents a measure of similarity of the segment of the waveform with a time-shifted version of the segment of the waveform.

3. A correlation method for analyzing the waveform of a time-limited signal, according to claim 2, wherein the measure of similarity is greatest where the segment of the waveform, relative to the time-shifted version, is shifted one complete period.

4. A correlation method for analyzing the waveform of a time-limited signal, according to claim 1, wherein the autocorrelation function represents a measure of dissimilarity of the segment of the waveform with a time-shifted version of the segment of the waveform.

5. A correlation method for analyzing the waveform of a time-limited signal, according to claim 4, wherein the measure of dissimilarity is greatest where the segment of the waveform, relative to the time-shifted version, is shifted by amount corresponding to a pulse width of the waveform.

6. A correlation method for analyzing the waveform of a time-limited signal, according to claim 1, wherein obtaining an approximate period of the waveform includes identifying a segment of the waveform having a steep slope magnitude that exceeds a certain threshold.

7. A correlation method for analyzing the waveform of a time-limited signal, according to claim 1, further including determining a polarity associated with the waveform.

8. A correlation method for analyzing the waveform of a time-limited signal, according to claim 1, wherein the autocorrelation function represents a measure of correspondence between the segment of the waveform with a time-shifted version of the segment of the waveform, and further including using a comparison waveform to determine a polarity associated with the period of the waveform.

9. A correlation apparatus adapted to analyze the waveform of a time-limited signal having a plurality of periods, comprising:
   means for providing an autocorrelation function of a segment of the waveform that includes at least one of the periods;
   means for obtaining an approximate period of the waveform using peaks in the autocorrelation function;
   means for providing data corresponding to a comparison waveform segment;
   means for measuring a time difference between consecutive maximum and minimum levels of a segment of the time-limited signal; and
   means for determining the polarity of the segment by cross-correlating the data corresponding to the comparison waveform segment and data corresponding to the segment of the time-limited signal.

10. A correlation apparatus, according to claim 9, wherein at least one of said means is included as part of: a test instrument and a data analysis package.

11. A correlation apparatus, according to claim 10, wherein the test instrument is an oscilloscope.

12. A correlation apparatus, according to claim 9, further comprising a programmable computer arrangement including at least one of said means.

13. A correlation apparatus adapted to analyze the waveform of a time-limited signal having a plurality of periods, comprising:
   a signal receiver adapted to receive a waveform segment that includes at least one of the periods; and
   a processor arrangement adapted to provide an autocorrelation function of the segment of the waveform, to obtain an approximate period of the waveform using peaks in the autocorrelation function, to provide data corresponding to a comparison waveform segment, to measure a time difference between consecutive maximum and minimum levels of a segment of the time-limited signal, and to determine the polarity of the segment by cross-correlating the data corresponding to the comparison waveform segment and data corresponding to the segment of the time-limited signal.

14. A correlation apparatus, according to claim 13, wherein the processor arrangement is further adapted to obtain an approximate period of the waveform by identifying a segment of the waveform having a steep slope magnitude that exceeds a certain threshold.

15. A correlation apparatus, according to claim 13, wherein the processor arrangement is further adapted to determine a polarity associated with the period of the waveform.

16. A correlation apparatus, according to claim 13, wherein the autocorrelation function represents a measure of correspondence between the segment of the waveform and a time-shifted version of the segment of the waveform.

17. A correlation method for analyzing the waveform of a time-limited signal having a plurality of periods, comprising:
   providing an autocorrelation function of a segment of the waveform that includes at least one of the periods, wherein the autocorrelation function represents a measure of correspondence between the segment of the waveform with a time-shifted version of the segment of the waveform;

obtaining an approximate period of the waveform using peaks in the autocorrelation function; and using a comparison waveform to determine a polarity associated with the period of the waveform.

* * * * *